D. B. HUTTON.
CONSTRUCTION OF FORCE OR LIFT PUMPS.
APPLICATION FILED JULY 9, 1919.

1,341,906. Patented June 1, 1920.

Inventor:-
David Brown Hutton.
By:- B. Singer, Atty.

UNITED STATES PATENT OFFICE.

DAVID BROWN HUTTON, OF WAIUKU, NEW ZEALAND.

CONSTRUCTION OF FORCE OR LIFT PUMPS.

1,341,906.  Specification of Letters Patent.  Patented June 1, 1920.

Application filed July 9, 1919. Serial No. 309,726.

*To all whom it may concern:*

Be it known that I, DAVID BROWN HUTTON, subject of the King of Great Britain, residing at Waiuku, New Zealand, have invented a new and useful Improved Construction of Force or Lift Pumps; and I do hereby declare the following to be a full, clear, and exact description of the same.

This invention relates to an improved construction of force or lift pump used for any of the usual purposes in which such classes of pumps are used, but particularly for the raising of water. The invention is applicable also to either horizontal or vertical pumps. It has been particularly devised with the object of dispensing with the gland and gland packing generally employed to close the end of the pump cylinder and to provide the bearing guide for the working of the pump plunger rod. The use of this gland causes considerable wear and friction upon the plunger rod and also upon the gland, necessitating constant attention to keep the gland tight to prevent leakage and in addition necessitating the employment of greater power to drive the plunger. It also involves the wearing and breaking of the plunger rod and other parts of the operating mechanism.

The invention has been specially devised for use in connection with the pumps operated by windmills and thereby to provide a pump needing less attention than those now in use, and also one that, through the removal of the friction grip of the gland packing on the plunger rod, may be operated in lighter winds than are required to drive those now in use, by reason of the said friction acting as a brake on the windmill sails.

The invention consists in constructing the pump with a cylindrical sleeve arranged continuously and concentrically with the cylinder, such sleeve being upon the inner end of the pump, and in carrying the plunger rod through such sleeve and providing it with a plunger or piston that is positioned in the sleeve and reciprocates therein in the working of the pump. This plunger or piston makes close contact with the wall of the cylinder and serves as a guide to keep the plunger rod centrally disposed and also as a seal for the inner end of the cylinder.

The invention may be carried out in different ways, as for instance by forming the said sleeve as an extension of the cylinder, or in forming it as an attachment to the inner cylinder end, in both instances the form of construction being governed by the nature of the pump and the size of the sleeve.

These general types of construction are illustrated in the accompanying drawings, in which:—

Figure 1:
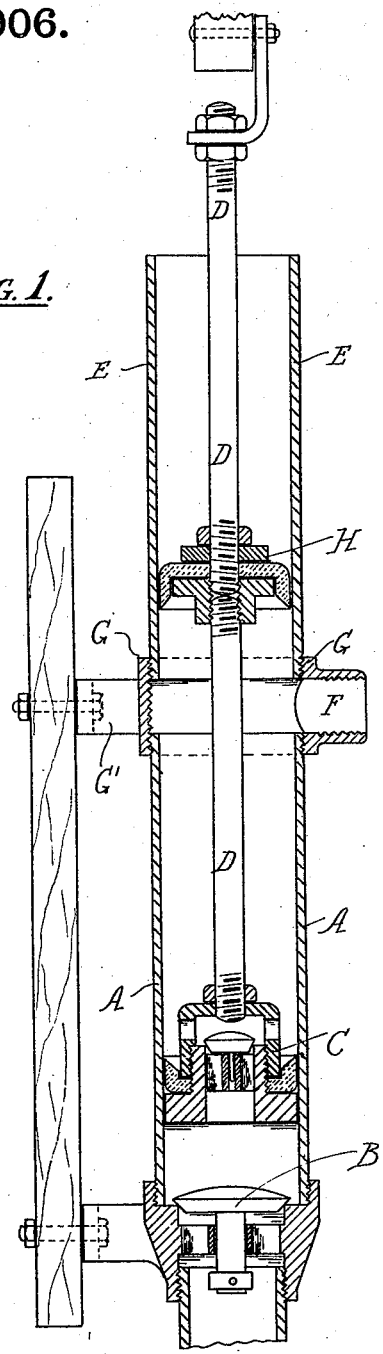
Figure 1 is a longitudinal sectional elevation of an ordinary lift pump having the sleeve formed as an extension of the cylinder.

Referring to Fig. 1, A is the pump cylinder having the usual inlet non-return valve B at its bottom end. C is the plunger, of ordinary bucket type, mounted in the cylinder and secured upon the lower end of the plunger rod D.

E is the extension upon the upper end of the cylinder. This may be formed in any approved manner such as to provide for it extending the required distance beyond the discharge outlet F. In the drawing it is shown as being made of a separate length coupled to the pump cylinder by means of the screw union G in which the discharge outlet F is made, such union also having the bracket attachments G' thereon for the mounting of the pump.

H is the plunger or piston positioned within the extension E such plunger or piston being secured upon the plunger rod D in any approved manner. In the drawings this is shown as being effected by forming the rod in separate lengths jointed together by screwing into the plunger from opposite sides thereof.

The leather of the plunger H is arranged in opposite relation to that of the plunger C so that this plunger H in the working of the pump will afford a watertight head to the cylinder.

It will be seen that as the pump is worked to cause the water to be lifted through the discharge F by the plunger C in the usual way, the plunger H will move up and down within the extension, above such discharge, so that it will act as a moving cylinder head and also as a guide to keep the plunger rod centrally disposed in the cylinder and thus obviate any tendency for the plunger C to jam.

Figure 2:
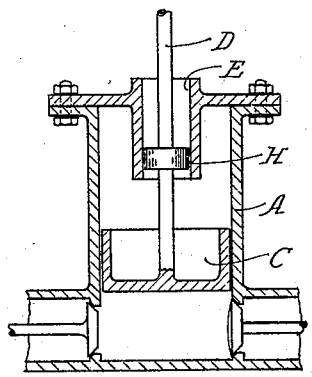
Fig. 2 is a similar elevation of a simple form of force pump having the sleeve formed as part of the cylinder head.

In Fig. 2 the sleeve is made as portion of the inner cylinder end J, the piston H reciprocating in such sleeve as the main piston reciprocates, the said piston H in this case also acting as a guide for the plunger rod and a cover for the cylinder end.

The invention may be carried out in other ways without departing from the principle of construction and operation involved. It is not necessary that the cylinder extension should be of the same diameter as the cylinder proper as the same general effect would be obtained by making it of smaller diameter. It will be readily understood also that the idea of the support and guide for the plunger rod moving with such rod and acting as a cover for the cylinder end may be adapted to many other types of pumps, whether designed for pumping air or liquids, in order to remove the disadvantages of the gland bearing beforementioned.

I claim:—

In a pump, a cylinder, a sleeve extending axially with the cylinder, a union member connecting said cylinder and said sleeve and provided with a discharge opening and also with an attaching bracket, a plunger rod extending through the cylinder and sleeve, a valved plunger at the lower end of said rod, and a piston also attached to said rod and arranged to operate in the sleeve.

In testimony whereof, I have signed this specification in the presence of two subscribing witnesses.

DAVID BROWN HUTTON.

Witnesses:
W. E. HUGHES,
F. V. ADAMS.